A. P. STOCKER.
WHEEL HUB FOR AUTOMOBILES AND SIMILAR VEHICLES.
APPLICATION FILED FEB. 13, 1911.
999,607.
Patented Aug. 1, 1911.
2 SHEETS—SHEET 1.
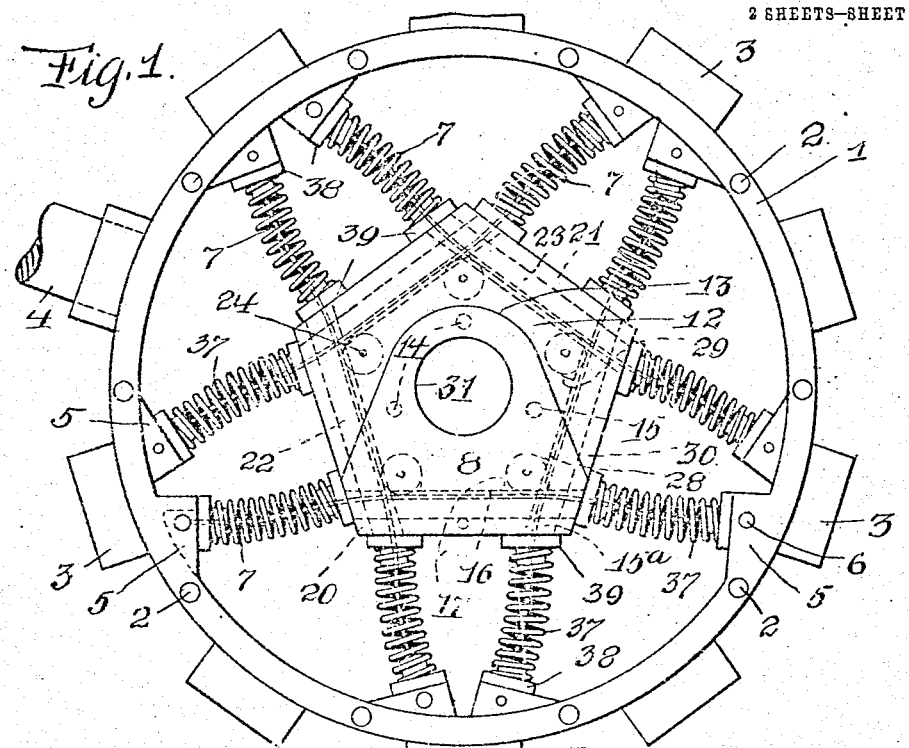
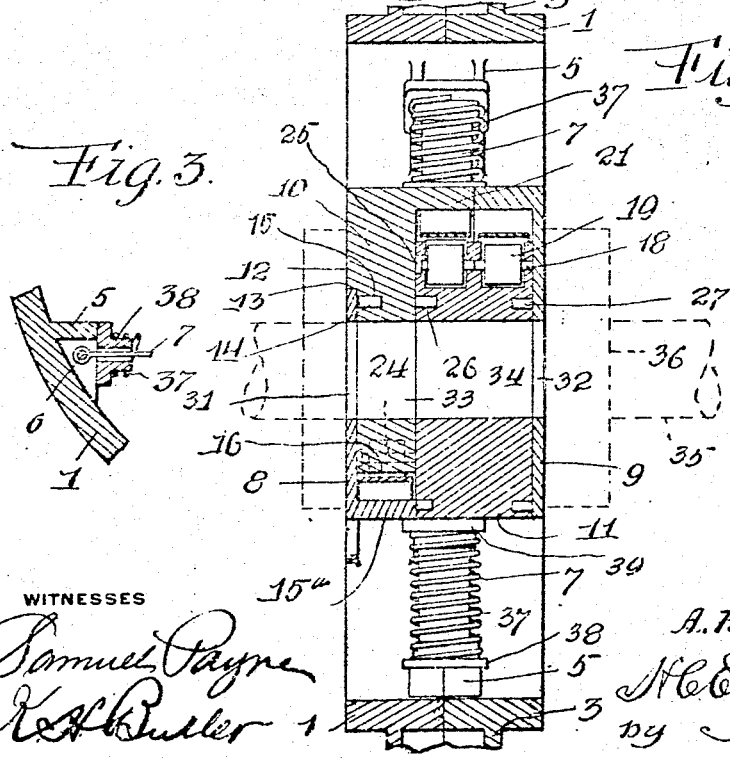
WITNESSES
Samuel Payne
K. H. Butler
INVENTOR
A. P. Stocker
N. C. Evert Co.
by Attorneys A. P. STOCKER.
WHEEL HUB FOR AUTOMOBILES AND SIMILAR VEHICLES.
APPLICATION FILED FEB. 13. 1911.

999,607.

Patented Aug. 1, 1911.

2 SHEETS—SHEET 2.

WITNESSES
Samuel Payne
K. H. Butler

INVENTOR
A. P. Stocker
N. C. Evert & Co.
by Attorneys

UNITED STATES PATENT OFFICE.

ALBERT P. STOCKER, OF STRUTHERS, OHIO.

WHEEL-HUB FOR AUTOMOBILES AND SIMILAR VEHICLES.

999,607.      Specification of Letters Patent.      Patented Aug. 1, 1911.

Application filed February 13, 1911. Serial No. 608,280.

*To all whom it may concern:*

Be it known that I, ALBERT P. STOCKER, a citizen of the United States of America, residing at Struthers, in the county of Mahoning and State of Ohio, have invented certain new and useful Improvements in Wheel-Hubs for Automobiles and Similar Vehicles, of which the following is a specification, reference being had therein to the accompanying drawing.

This invention relates to hubs for vehicles, particularly automobiles, and the primary object of the invention is the provision of resilient means, in a manner as will be hereinafter set forth, for yieldably supporting the hub of a wheel.

Another object of the invention is to provide a vehicle hub that will obviate the necessity of using pneumatic tires and in some instances cushioning springs in connection with a vehicle.

A further object of the invention is to provide a hub of the above type consisting of comparatively few parts that are durable, easy to assemble and highly efficient for the purposes for which they are intended.

With these and such other objects in view as may hereinafter appear, the invention resides in the novel construction, combination and arrangement of parts to be hereinafter specifically described and then particularly claimed.

Reference will now be had to the drawings, wherein:—

Figure 4:
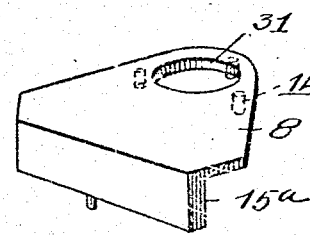
Figure 5:
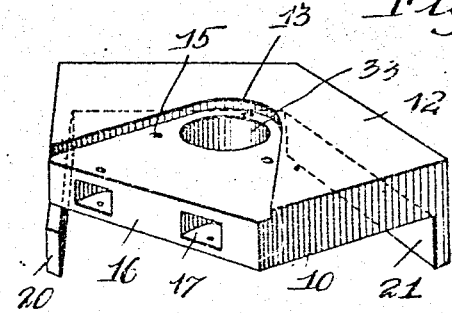
Figure 6:
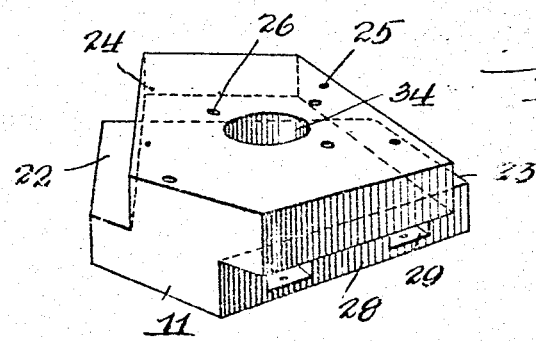
Figure 7:
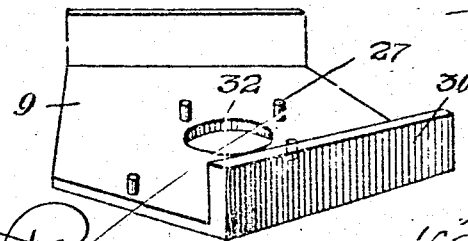

Figure 1 is a side elevation of the hub, Fig. 2 is a central vertical sectional view of the same, Fig. 3 is a longitudinal sectional view of a bearing block adapted to form part of the hub, Fig. 4 is a perspective view of a detached outer plate, Fig. 5 is a similar view of a detached inner block, Fig. 6 is a similar view of another inner block, and Fig. 7 is a perspective view of another outer plate.

A hub in accordance with this invention comprises two rings 1 adapted to be placed side by side and connected by transverse ribs 2 or other fastening means, said rings having the outer side thereof provided with socket sections 3, the sections of one ring confronting the sections of the adjoining ring and holding the inner ends of spokes 4.

The inner sides of the rings 1 are provided with equally spaced sets of brackets 5 and arranged transversely of these brackets are pins 6. Wrapped around said pins are the ends of resilient straps 7. The brackets 5 are disposed upon the inner sides of the rings 1 whereby the straps 7 will have a "star" formation, the ends of the straps converging and representing the points of the star, and in order that the straps can be compactly arranged and pass one another centrally of the rings 1, some of the brackets are off-set relatively to other brackets, as will hereinafter appear.

The resilient straps support a hub, comprising outer plates 8 and 9 and inner blocks 10 and 11. The blocks 10 and 11 are polygonal in plan and constructed to interlock with the plates 8 and 9 upon the outer sides. The inner block 10 has the outer face 12 thereof provided with a recess 13 and the plate 8 is shaped to fit in said recess. The plate 8 is provided with dowel pins 14 adapted to engage in sockets 15 provided therefor in the bottom of the recess 13, and said plate is furthermore provided with a depending flange 15ᵃ adapted to confront the side 16 of the block 10. The side 16 of the block 10 is provided with pockets 17 and revolubly mounted in said pockets on pins 18 are anti-friction rollers 19, these rollers engaging one of the straps 7 that rides between the flange 15ᵃ and the side 16.

The underneath side of the block 10 is provided with two depending flanges 20 and 21 in longitudinal alinement with two of the walls of said block, and these flanges are adapted to extend downwardly into the cut away portions 22 and 23 of the block 11. The walls bordering upon the cut away portions 22 and 23 are provided with pockets similar to the pockets 17, and intersecting these pockets are pins 24 and 25 upon which anti-friction rollers are journaled. The top of the block 11 is provided with sockets 26 adapted to receive depending dowel pins carried by the block 10, and the bottom of the block 11 is provided with similar sockets to receive dowel pins 27, carried by the plate 9.

Two of the side walls of the block 11 have the underneath edges thereof cut away, as at 28, and provided with pockets 29 for anti-friction rollers similar to the rollers 19, and confronting these rollers are the vertical flanges 30 of the plate 9; the block 12 having the flanges 20 and 21 thereof confronting the anti-friction rollers held by the pins 24 and 25.

The plates 8 and 9, blocks 10 and 11 are provided with longitudinally alining openings 31, 32, 33 and 34 adapted to receive the spindle 35 of an axle with the blocks and plates retained together upon the spindle by collars 36, carried by said spindle.

Encircling the straps 7 between the hub and the rings 1 are coiled compression springs 37 having the outer ends thereof mounted upon bearing blocks 38 resting upon the brackets 5, and the inner ends engaging bearing blocks 39 resting upon the hub.

From the foregoing it will be observed that four of the straps 7 engage the anti-friction rollers 19 in four sides of the inner block 11 and that the fifth strap engages the rollers of the inner block 10, these rollers in conjunction with the flanges of the block 10 and plates 8 and 9 forming guide ways for the straps 7, allowing the straps to shift in the hub upon the anti-friction rollers. The arrangement of the resilient straps 7 and the springs 37 is such that all of said springs and straps coöperate in cushioning a movement of the spindle 35 and the hub thereof, said hub under ordinary conditions being normally retained centrally of the ring 1 with the central opening of the hub concentric relatively to the spoke ring.

The hub in its entirety can be made of light and durable metal and the anti-friction rollers are easily lubricated.

What I claim is:—

1. A hub of the type described comprising spoke rings, resilient straps having a star formation within said rings with the ends of said straps supported by the inner sides of said rings, inner blocks mounted upon said straps, outer plates engaging the outer sides of said blocks, anti-friction rollers carried by said inner blocks and adapted to engage said straps, means for retaining said blocks and said plates together upon said straps, and coiled compression springs mounted upon said straps between said rings and the outer sides of said blocks.

2. A hub of the type described comprising spoke rings, brackets carried by the inner sides thereof, resilient straps having a star shaped formation in said rings with the ends of said straps mounted in said brackets, inner polygonal shaped blocks arranged upon said straps, outer plates mounted upon the outer sides of said blocks, anti-friction rollers carried by said blocks and adapted to engage said straps, bearing blocks mounted upon said straps between said brackets and the outer sides of said blocks, coiled compression springs encircling said straps between said bearing blocks, and means for connecting said inner blocks and said plates together, substantially as described.

In testimony whereof I affix my signature in the presence of two witnesses.

ALBERT P. STOCKER.

Witnesses:
H. L. WILSON,
ROY McCUNE.